US008722837B2

(12) United States Patent
Carrillo et al.

(10) Patent No.: US 8,722,837 B2
(45) Date of Patent: May 13, 2014

(54) POLY(PHENYLENE ETHER)-POLYSILOXANE COMPOSITION AND METHOD

(75) Inventors: Alvaro Carrillo, Delmar, NY (US); Hua Guo, Beijing (CN); Scott Fisher, Delmar, NY (US)

(73) Assignee: Sabic Innovative Plastics IP B.V. (NL)

( * ) Notice: Subject to any disclaimer, the term of this patent is extended or adjusted under 35 U.S.C. 154(b) by 19 days.

(21) Appl. No.: 13/362,426

(22) Filed: Jan. 31, 2012

(65) Prior Publication Data
US 2013/0197167 A1 Aug. 1, 2013

(51) Int. Cl.
*C08G 65/38* (2006.01)
*C08G 77/46* (2006.01)

(52) U.S. Cl.
USPC ............ 528/29; 528/86; 528/212; 528/219

(58) Field of Classification Search
USPC ..... 525/92 A, 92 G, 393, 431, 446, 474, 478; 528/25, 29
See application file for complete search history.

(56) References Cited

U.S. PATENT DOCUMENTS

| 2,071,250 | A | | 7/1931 | Carothers |
| 2,071,251 | A | | 2/1937 | Carothers |
| 2,130,523 | A | | 9/1938 | Carothers |
| 2,130,948 | A | | 9/1938 | Carothers |
| 2,241,322 | A | | 5/1941 | Hanford |
| 2,312,966 | A | | 3/1943 | Hanford |
| 2,465,319 | A | | 3/1949 | Whinfield |
| 2,512,606 | A | | 6/1950 | Bolton et al. |
| 2,720,502 | A | | 10/1955 | Caldwell |
| 2,727,881 | A | | 12/1955 | Caldwell |
| 2,822,348 | A | | 2/1958 | Haslam |
| 3,047,539 | A | | 7/1962 | Pengilly |
| 3,379,792 | A | | 4/1968 | Finholt |
| 3,671,487 | A | | 6/1972 | Abolins |
| 3,716,589 | A | | 2/1973 | Kotanigawa et al. |
| 3,953,394 | A | | 4/1976 | Fox et al. |
| 3,979,464 | A | | 9/1976 | Leach |
| 4,011,200 | A | * | 3/1977 | Yonemitsu et al. ............. 528/86 |
| 4,128,526 | A | | 12/1978 | Borman |
| 4,128,728 | A | | 12/1978 | Arnold et al. |
| 4,226,761 | A | | 10/1980 | Cooper et al. |
| 4,283,574 | A | | 8/1981 | Leach |
| 4,301,308 | A | | 11/1981 | Canavesi et al. |
| 4,546,093 | A | | 10/1985 | Chang et al. |
| 4,664,972 | A | | 5/1987 | Connolly |
| 4,769,424 | A | | 9/1988 | Takekoshi et al. |
| 4,814,392 | A | | 3/1989 | Shea et al. |
| 4,822,836 | A | | 4/1989 | Wroczynski |
| 4,871,816 | A | | 10/1989 | Percec et al. |
| 4,879,346 | A | | 11/1989 | Bopp et al. |
| 4,970,272 | A | | 11/1990 | Gallucci |
| 5,000,897 | A | | 3/1991 | Chambers |
| 5,021,543 | A | | 6/1991 | Mayska et al. |
| 5,032,635 | A | | 7/1991 | Avakian et al. |
| 5,061,746 | A | | 10/1991 | Gallucci |
| 5,110,896 | A | | 5/1992 | Waggoner et al. |
| 5,132,365 | A | | 7/1992 | Gallucci |
| 5,169,887 | A | | 12/1992 | Snow et al. |
| 5,204,438 | A | | 4/1993 | Snow et al. |
| 5,258,455 | A | | 11/1993 | Laughner et al. |
| 5,260,359 | A | | 11/1993 | Muehlbach et al. |
| 5,281,686 | A | | 1/1994 | Blohm et al. |
| 5,294,655 | A | | 3/1994 | Lee, Jr. et al. |
| 5,357,003 | A | | 10/1994 | Smits et al. |
| 5,357,022 | A | * | 10/1994 | Banach et al. ............... 528/29 |
| 5,364,898 | A | | 11/1994 | Lee, Jr. et al. |
| 5,385,984 | A | | 1/1995 | Blohm et al. |
| 5,470,913 | A | | 11/1995 | Van De Meer et al. |
| 5,484,858 | A | | 1/1996 | Smits et al. |
| 5,561,193 | A | | 10/1996 | Gottschalk et al. |
| 5,612,425 | A | | 3/1997 | Weber et al. |
| 5,618,885 | A | | 4/1997 | Kotek et al. |
| 5,625,011 | A | | 4/1997 | Palsule |
| 5,693,700 | A | | 12/1997 | Venkataramani et al. |
| 5,714,550 | A | | 2/1998 | Shaw |
| 5,750,603 | A | | 5/1998 | Asrar |
| 5,817,891 | A | | 10/1998 | Brocker et al. |
| 5,916,952 | A | | 6/1999 | Romenesko et al. |
| 6,025,419 | A | | 2/2000 | Kasowski et al. |
| 6,043,315 | A | | 3/2000 | Gottschalk et al. |
| 6,072,011 | A | | 6/2000 | Hoover |
| 6,093,771 | A | | 7/2000 | Wunsch et al. |
| 6,339,131 | B1 | * | 1/2002 | Cella et al. ............... 525/474 |

(Continued)

FOREIGN PATENT DOCUMENTS

CA 2052488 4/1992
EP 0133641 A1 3/1985

(Continued)

OTHER PUBLICATIONS

Final Office Action for U.S. Appl. No. 12/644,272, filed Dec. 22, 2009, Date of Mailing Oct. 5, 2012, 12 pages.
International Search Report and Written Opinion; International Application No. PCT/US2012/042175; International Filing Date Jun. 13, 2012; Date of Mailing Mar. 12, 2013; 10 pages.
U.S. Appl. No. 13/705,309, filed Dec. 5, 2012.
International Search Report and Written Opinion; International Application No. PCT/US2012/044897; International Filing Date Jun. 29, 2012; Date of Mailing Jan. 23, 2013; Agent's File Reference P020412US); 8 pages.
Final Office Action for U.S. Appl. No. 12/277,835, Notification Date Dec. 1, 2010, 12 pages.

(Continued)

*Primary Examiner* — Marc Zimmer
(74) *Attorney, Agent, or Firm* — Cantor Colburn LLP

(57) ABSTRACT

A composition is prepared by oxidative copolymerization of specific amounts of 2,6-dimethylphenol, 2,3,6-trimethylphenol, and a hydroxyaryl-terminated polysiloxane. The composition exhibits an increased heat resistance relative to a corresponding composition prepared by copolymerizing 2,6-dimethylphenol and hydroxyaryl-terminated polysiloxane, without 2,3,6-trimethylphenol. The composition is useful as a flame-retardant additive in polymer compositions that require high heat resistance.

5 Claims, No Drawings

(56) References Cited

U.S. PATENT DOCUMENTS

| | | | |
|---|---|---|---|
| 6,593,411 | B2 | 7/2003 | Koevoets et al. |
| 6,875,824 | B2 | 4/2005 | Fishburn |
| 7,034,099 | B2 | 4/2006 | Kamps et al. |
| 7,087,666 | B2 | 8/2006 | Hoerold et al. |
| 7,115,677 | B2 | 10/2006 | Harashina et al. |
| 7,148,276 | B2 | 12/2006 | Bauer et al. |
| 7,151,158 | B2 | 12/2006 | Ingelbrecht |
| 7,166,243 | B2 | 1/2007 | Elkovitch et al. |
| 7,205,346 | B2 | 4/2007 | Harashina |
| 7,247,666 | B2 | 7/2007 | Urabe et al. |
| 7,255,814 | B2 | 8/2007 | Hoerold et al. |
| 7,259,200 | B2 | 8/2007 | Bauer et al. |
| 7,273,901 | B2 | 9/2007 | Sicken et al. |
| 7,329,708 | B2 | 2/2008 | Birsak et al. |
| 7,332,534 | B2 | 2/2008 | Knop et al. |
| 7,432,311 | B2 | 10/2008 | Mezzenga et al. |
| 7,439,288 | B2 | 10/2008 | Sicken et al. |
| 7,449,507 | B2 | 11/2008 | Fishburn |
| 7,449,508 | B2 | 11/2008 | Steib et al. |
| 7,488,766 | B2 | 2/2009 | Peters et al. |
| 7,534,822 | B2 | 5/2009 | Elkovitch et al. |
| 7,541,421 | B2 | 6/2009 | Carrillo et al. |
| 7,550,534 | B2 | 6/2009 | Zhao et al. |
| 7,553,912 | B2 | 6/2009 | Ikuta et al. |
| 7,576,150 | B2 | 8/2009 | Klei et al. |
| 7,582,692 | B2 | 9/2009 | Kosaka et al. |
| 7,592,382 | B2 | 9/2009 | Borade et al. |
| 7,608,651 | B2 | 10/2009 | Borade et al. |
| 7,652,107 | B2 | 1/2010 | Gallucci et al. |
| 7,772,322 | B2 | 8/2010 | Kosaka et al. |
| 7,803,856 | B2 | 9/2010 | Perego et al. |
| 7,816,438 | B2 | 10/2010 | Seki et al. |
| 7,838,580 | B2 | 11/2010 | Bauer et al. |
| 7,847,032 | B2 | 12/2010 | Guo et al. |
| 7,947,201 | B2 | 5/2011 | Ting |
| 8,017,697 | B2 | 9/2011 | Carrillo et al. |
| 8,263,697 | B2 | 9/2012 | Miyoshi et al. |
| 2004/0176506 | A1 | 9/2004 | Sicken et al. |
| 2004/0225040 | A1 | 11/2004 | Hoerold |
| 2005/0250885 | A1 | 11/2005 | Mercx et al. |
| 2006/0020064 | A1 | 1/2006 | Bauer et al. |
| 2006/0089435 | A1 | 4/2006 | Hoerold et al. |
| 2006/0111548 | A1 | 5/2006 | Elkovitch et al. |
| 2006/0167143 | A1 | 7/2006 | Borade et al. |
| 2006/0208239 | A1 | 9/2006 | Bauer et al. |
| 2007/0208144 | A1 | 9/2007 | Delsman et al. |
| 2007/0208159 | A1 | 9/2007 | McCloskey et al. |
| 2008/0071036 | A1 | 3/2008 | Delsman et al. |
| 2009/0318635 | A1* | 12/2009 | Carrillo et al. ............... 525/474 |
| 2010/0139944 | A1* | 6/2010 | Guo et al. ............... 174/110 SR |
| 2011/0152431 | A1 | 6/2011 | Elkovitch et al. |
| 2011/0152471 | A1 | 6/2011 | Kamalakaran et al. |
| 2011/0190453 | A1* | 8/2011 | Carrillo et al. ............... 525/393 |
| 2011/0190454 | A1* | 8/2011 | Carrillo et al. ............... 525/393 |

FOREIGN PATENT DOCUMENTS

| | | | |
|---|---|---|---|
| EP | 0683209 | A2 | 5/1995 |
| EP | 0714951 | A1 | 6/1996 |
| EP | 1253164 | A1 | 10/2002 |
| GB | 1353501 | | 5/1974 |
| JP | 1986252214 | | 11/1986 |
| JP | 6200038 | | 7/1994 |
| JP | 2004231769 | A | 8/2004 |
| WO | 8707281 | | 12/1987 |
| WO | 9711123 | A1 | 3/1997 |
| WO | 9808898 | | 3/1998 |
| WO | 0140353 | A1 | 6/2001 |
| WO | 2006062656 | A2 | 6/2006 |
| WO | WO 2007050077 | * | 5/2007 |
| WO | 2007106296 | A2 | 9/2007 |
| WO | 2011134622 | A1 | 11/2011 |
| WO | 2011134623 | A1 | 11/2011 |
| WO | 2012007124 | A1 | 1/2012 |

OTHER PUBLICATIONS

Non-Final Office Action for U.S. Appl. No. 12/331,802, Notifcation Date Jan. 27, 2010, 13 pages.
Final Office Action for U.S. Appl. No. 12/644,144, Notification Date Feb. 14, 2012, 14 pages.
Non-Final Office Action for U.S. Appl. No. 12/644,144, Notification Date Oct. 12, 2011, 30 pages.
Final Office Action for U.S. Appl. No. 12/644,221 Notificaton Date Sep. 28, 2011, 21 pages.
Non-Final Office Action for U.S. Appl. No. 12/644,221, Notification Date May 2, 2011, 31 pages.
Non-Final Office Action for U.S. Appl. No. 12/644,272, Notification Date Jul. 18, 2011, 28 pages.
Final Office Action for U.S. Appl. No. 12/644,272, Notification Date Dec. 15, 2011, 14 pages.
Non-Final Office Action for U.S. Appl. No. 13/043,502, Notification Date Jun. 2, 2011, 11 pages.
Final Office Action for U.S. Appl. No. 13/043,502, Notification Date Dec. 16, 2011, 38 pages.
Final Office Action for U.S. Appl. No. 13/043,506, Notification Date Dec. 16, 2011, 12 pages.
Non-Final Office Action for U.S. Appl. No. 13/043,506, Notification Date Sep. 15, 2011, 37 pages.
Albemarle, "Saytex HP-3010, Flame Retardant", Albemarle Corporation, 2008, 2 pages.
Allen et al., "Synthesis and properties of xylenyl ether-dimethylsiloxane triblock polymers", Polymer Bulletin 19, 1988, pp. 103-110.
Chan et al., "Facile Quantitative Analysis of Hydroxyl End Groups of Poly(2,6-dimethyl-1, 4-phenylene oxide)s by 31P NMR Spectroscopy", Macromolecules, vol. 27, 1994 pp. 6371-6375, Abstract.
Clariant, "Exolit Overview", Nov. 2008 edition, 7 pages.
Clairant, "Exolit OP 1312 Flame Retardants PHP", Product Data Sheet, Edition Feb. 4, 2009, 2 pages.
JP2002047409A, Abstract, Feb. 12, 2002, 1 pages.
JP2003105193A, Abstract, Apr. 9, 2003, 1 page.
JP2004231789 A, Abstract, Aug. 19, 2004, 1 page.
JP2005333698A, Abstract, Dec. 2, 2005, 1 page.
JP3126744A, Abstract, May 29, 1991, 1 page.
JP405230360A, Abstract, Sep. 7, 1993, 1 page.
JP4077552A, Abstract, Mar. 11, 1992, 1 page.
JP57195122A, Abstract, Nov. 30, 1982, 1 page.
JP6200015A, Abstract, Jul. 19, 1994, 1 page.
JP63202652A, Abstract, Aug. 22, 1988, 1 page.
JP9003322A, Abstract, Jan. 7, 1997, 1 page.
JP9279044, Abstract, Oct. 28, 1997, 1 page.
Pape et al., "The Role of Silicone Powders in Reducing the Heat Release Rate and Evolution of Smoke in Flame Retardant Thermoplastics", J. of Vinyl & Additive Tech., vol. 3, No. 3, 1997, pp. 225-231.
International Search Report for International Application No. PCT/IB2010/055482, International Filing Date Nov. 29, 2010, Date of Mailing May 13, 2011, 4 pages.
Written Opinion, for International Application No. PCT/IB2010/055482, International Filing Date Nov. 29, 2010, Date of Mailing May 13, 2011, 6 pages.
International Search Report of International Application No. PCT/US2009/064110, International Filing Date Nov. 12, 2009, Date of Mailing May 27, 2010, 8 pages.
Written Opinion for International Application No. PCT/US2009/064110, International Filing Date Nov. 12, 2009, Date of Mailing May 27, 2010, 5 pages.
International Search Report for International Application No. PCT/US2010/058146, International Filing Date Nov. 29, 2010, Date of Mailing August 16, 2011, 5 pages.
Written Opinion for International Application No. PCT/US2010/058146, International Filing Date Nov. 29, 2010, Date of Mailing Aug. 16, 2011, 4 pages.
International Search Report for International Application No. PCT/US2010/058166, International Filing Date Nov. 29, 2010, Date of Mailing Aug. 17, 2011, 5 pages.

(56) References Cited

OTHER PUBLICATIONS

Written Opinion for International Application No. PCT/US2010/058166, International Filing Date Nov. 29, 2010, Date of Mailing Aug. 17, 2011, 4 pages.
Skoog et al., "Principles of Instrumental Analysis", 4th Edition, Sanders College Publishing, 1992, pp. 568-578.
Weil et al., "Flame Retardants for Plastics and Textiles", Practical Applications, Hanswer Publications, 2009, pp. 88-90 and 100-101.
U.S. Appl. No. 12/644,272 Non-Final Office Action, Application Filing Date Dec. 22, 2009, Notification Date Jul. 6, 2012, 14 pages.
U.S. Appl. No. 13/650,366 filed Oct. 12, 2012.
DE3834086 A1, Apr. 19, 1990, Abstract Only, 2 pages.
JP2010018906 A, Jan. 28, 2010, Abstract Only, 1 page.
Vydyne 21ZLV, Product Data Sheet, downloaded from http://53af052f81856517219b-5c898576c0a79c837f1ed1d0ad49d31c.r80.cf1.rackcdn.com/949F8095-64A7-ECED-713C-C80E3E51227D on Jun. 1, 2012, 1 page.
U.S. Appl. No. 13/902,671, filed May 24, 2013.
International Search Report for International Application No. PCT/US2010/069337, International Application Filing Date Dec. 13, 2012; Date of Mailing Apr. 22, 2013, 5 pages.
Written Opinion for International Application No. PCT/US2012/069337, International Application Filing Date Dec. 13, 2012; Date of Mailing Apr. 22, 2013, 4 pages.
Final Office Action for U.S. Appl. No. 12/644,221, Application Filing Date Dec. 22, 2009, Notification Date Dec. 24, 2013, 13 pages.
Final Office Action for U.S. Appl. No. 13/189,651, Application Filing Date Jul. 25, 2011, Notification Date Sep. 6, 2013, 23 pages.
Non-Final Office Action for U.S. Appl. No. 13/650,366, Application Filing Date Oct. 12, 2012, Notification Date Dec. 5, 2013, 67 pages.
International Search Report for International Application No. PCT/US2013/056610, International Application Filing Date Aug. 26, 2013; Date of Mailing Nov. 18, 2013, 6 pages.
Written Opinion for International Application No. PCT/US2013/056610, International Application Filing Date Aug. 26, 2013; Date of Mailing Nov. 18, 2013, 6 pages.

* cited by examiner

POLY(PHENYLENE ETHER)-POLYSILOXANE COMPOSITION AND METHOD

BACKGROUND OF THE INVENTION

Block copolymers that include a poly(phenylene ether) block and a polysiloxane block are known materials that are useful components of various thermoplastic and thermoset compositions. Their polysiloxane content makes them particularly useful as flame retardant additives. They can also be employed as compatibilizers to stabilize otherwise poorly compatible blends of polysiloxanes with aromatic polymers, such as polystyrenes, poly(phenylene ether)s, aromatic polyesters, aromatic polyamides, and aromatic polyimides.

Poly(phenylene ether)-polysiloxane block copolymers are most efficiently prepared by oxidative copolymerization of a monohydric phenol and a hydroxyaryl-terminated polysiloxane. For example, Banach et al. in U.S. Pat. No. 5,357,022 have reported the oxidative copolymerization of 2,6-dimethylphenol and a silicone macromer having terminal phenol groups. And Carrillo et al. in U.S. Patent Application Publication No. 2009/0318635 A1 describe an improved method of oxidative copolymerization that increases the extent of silicone macromer incorporation into the block copolymer.

One disadvantage of known poly(phenylene ether)-polysiloxane block copolymers is that they have a lower glass transition temperature than the corresponding poly(phenylene ether). This means that although the substitution of poly(phenylene ether)-polysiloxane block copolymer for poly(phenylene ether) may increase the flame retardancy of a polymer blend, it can also decrease the heat resistance of the blend. There is therefore a need for poly(phenylene ether)-polysiloxane block copolymers that provide improved heat resistance.

BRIEF DESCRIPTION OF THE INVENTION

The present invention relates to a thermoplastic composition, comprising: a poly(2,6-dimethyl-1,4-phenylene ether-co-2,3,6-trimethyl-1,4-phenylene ether); and a block copolymer comprising a poly(2,6-dimethyl-1,4-phenylene ether-co-2,3,6-trimethyl-1,4-phenylene ether) block, and a polysiloxane block comprising, on average, about 10 to about 100 siloxane repeating units; wherein the thermoplastic composition comprises about 65 to about 93 weight percent of 2,6-dimethyl-1,4-phenylene ether units, about 5 to about 25 weight percent of 2,3,6-trimethyl-1,4-phenylene ether units, and about 2 to about 10 weight percent of siloxane units; and wherein all weight percents are based on the total weight of the thermoplastic composition, unless a different weight basis is specified.

One embodiment of the present invention is a thermoplastic composition, comprising: a poly(2,6-dimethyl-1,4-phenylene ether-co-2,3,6-trimethyl-1,4-phenylene ether); and a block copolymer comprising a poly(2,6-dimethyl-1,4-phenylene ether-co-2,3,6-trimethyl-1,4-phenylene ether) block, and a polysiloxane block; wherein the polysiloxane block has the structure

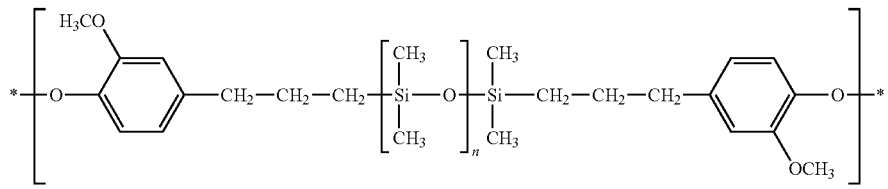

wherein n is about 35 to about 60; wherein the thermoplastic composition comprises about 75 to about 84 weight percent of 2,6-dimethyl-1,4-phenylene ether units, about 13 to about 19 weight percent of 2,3,6-trimethyl-1,4-phenylene ether units, and about 3 to about 7 weight percent of dimethylsiloxane units; and wherein all weight percents are based on the total weight of the thermoplastic composition, unless a different weight basis is specified.

Another embodiment is a method of preparing a thermoplastic composition, comprising: oxidatively copolymerizing a monomer composition in an aromatic hydrocarbon solvent to form a solution comprising a poly(2,6-dimethyl-1,4-phenylene ether-co-2,3,6-trimethyl-1,4-phenylene ether); and a block copolymer comprising a poly(2,6-dimethyl-1,4-phenylene ether-co-2,3,6-trimethyl-1,4-phenylene ether) block, and a polysiloxane block comprising, on average, about 10 to about 100 siloxane repeating units; wherein the monomer composition comprises about 65 to about 93 weight percent of 2,6-dimethylphenol, about 5 to about 25 weight percent of 2,3,6-trimethylphenol, and about 2 to about 10 weight percent of a hydroxyaryl-terminated polysiloxane.

Another embodiment is a polymer blend, comprising: about 5 to about 95 weight percent, based on the weight of the polymer blend, of a polymer selected from the group consisting of polystyrenes, polyamides, polyolefins, polyesters, and combinations thereof; and about 5 to about 95 weight percent, based on the weight of the polymer blend, of a thermoplastic composition, comprising a poly(2,6-dimethyl-1,4-phenylene ether-co-2,3,6-trimethyl-1,4-phenylene ether); and a block copolymer comprising a poly(2,6-dimethyl-1,4-phenylene ether-co-2,3,6-trimethyl-1,4-phenylene ether) block, and a polysiloxane block comprising, on average, about 10 to about 100 siloxane repeating units; wherein the thermoplastic composition comprises, based on the weight of the thermoplastic composition, about 65 to about 93 weight percent of 2,6-dimethyl-1,4-phenylene ether units, about 5 to about 25 weight percent of 2,3,6-trimethyl-1,4-phenylene ether units, and about 2 to about 10 weight percent of siloxane units.

These and other embodiments are described in detail below.

DETAILED DESCRIPTION OF THE INVENTION

The present inventors have determined that poly(phenylene ether)-polysiloxane block copolymers exhibiting increased heat resistance can be prepared by oxidatively polymerizing a monomer composition comprising specific amounts of 2,6-dimethylphenol, 2,3,6-trimethylphenol, and a hydroxyaryl-terminated polysiloxane. The increased heat resistance is objectively manifested as an increased glass transition temperature relative to copolymers of 2,6-dimethylphenol and a hydroxyaryl-terminated polysiloxane.

2,6-Dimethylphenol (CAS Registry No. 576-26-1), also known as 2,6-xylenol, can be prepared by reaction of phenol and methanol at elevated temperature. See, for example, U.S. Pat. No. 3,716,589 to Kotanigawa et al., U.S. Pat. No. 4,301,308 to Canavesi et al., and U.S. Pat. No. 4,546,093 to Chang et al. 2,6-Dimethylphenol is also commercially available in bulk. The monomer composition can comprise the 2,6-dimethylphenol in an amount of about 65 to about 93 weight percent, specifically about 70 to about 88 weight percent, more specifically about 75 to about 84 weight percent, based on the weight of the monomer composition.

2,3,6-Trimethylphenol (CAS Registry No. 2416-94-6), like 2,6-dimethylphenol, can be prepared by reaction of phenol and methanol at elevated temperature. U.S. Pat. No. 4,283,574 to Leach describes a process for the synthesis of 2,6-dimethylphenol and 2,3,6-trimethylphenol. Other processes for the preparation of 2,3,6-trimethylphenol are described in U.S. Pat. No. 3,979,464 to Leach, U.S. Pat. No. 4,128,728 to Arnold et al., and U.S. Pat. No. 5,817,891 to Brocker et al. 2,3,6-Trimethylphenol is also commercially available. The monomer composition can comprise the 2,3,6-trimethylphenol in an amount of about 5 to about 25 weight percent, specifically about 10 to about 22 weight percent, more specifically about 13 to about 19 weight percent, based on the weight of the monomer composition. When the amount of 2,3,6-trimethylphenol in the monomer composition is less than about 5 weight percent, the heat resistance of the thermoplastic composition may be insufficient. When the amount of 2,3,6-trimethylphenol in the monomer composition is greater than about 25 weight percent, the solubility of the block copolymer in aromatic hydrocarbon solvents can be undesirably reduced.

In addition to the 2,6-dimethylphenol and the 2,3,6-trimethylphenol, the monomer composition comprises a hydroxyaryl-terminated polysiloxane. A hydroxyaryl-terminated polysiloxane is a compound that comprises at least one polysiloxane group and at least one hydroxyaryl group. In some embodiments, the hydroxyaryl-terminated polysiloxane has a single hydroxyaryl terminal group, in which case a poly(phenylene ether)-polysiloxane diblock copolymer is formed on polymerization of the monomer composition. In other embodiments, the hydroxyaryl-terminated polysiloxane has two hydroxyaryl terminal groups, in which case in which case poly(phenylene ether)-polysiloxane diblock copolymers and/or poly(phenylene ether)-polysiloxane-poly(phenylene ether)triblock copolymers are formed on polymerization of the monomer composition. It is also possible for the hydroxyaryl-terminated polysiloxane to have a branched structure that allows three or more hydroxyaryl terminal groups and the formation of corresponding branched copolymers on polymerization of the monomer composition.

In some embodiments, the polysiloxane group comprises siloxane repeating units having the structure

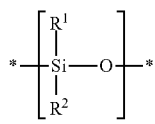

wherein each occurrence of $R^1$ and $R^2$ is independently hydrogen, $C_1$-$C_{12}$ hydrocarbyl or $C_1$-$C_{12}$ halohydrocarbyl. In some embodiments, the polysiloxane repeating unit is a dimethylsiloxane (—Si(CH$_3$)$_2$O—) unit.

In some embodiments, the hydroxyaryl group has the structure

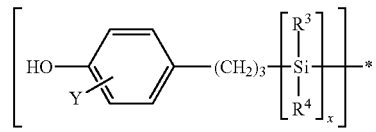

wherein Y is hydrogen, $C_1$-$C_{12}$ hydrocarbyl, $C_1$-$C_{12}$ hydrocarbyloxy, or halogen; each occurrence of $R^3$ and $R^4$ is independently hydrogen, $C_1$-$C_{12}$, hydrocarbyl or $C_1$-$C_{12}$ halohydrocarbyl; and x is 0 or 1. In some embodiments, the hydroxyaryl-terminated polysiloxane has the structure

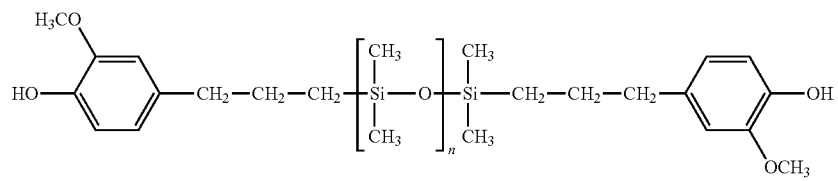

wherein n is about 10 to about 100, specifically about 20 to about 80, more specifically about 20 to about 60, even more specifically about 35 to about 60. Such hydroxyaryl-terminated polysiloxanes can be prepared by a hydrosilylation reaction between a silyl hydride-terminated polydimethylsiloxane and eugenol.

In some embodiments, at least 90 mole percent of the siloxane units are incorporated into the block copolymer. Conversely, in these embodiments, no more than 10 mole percent of the siloxane units are present as hydroxyaryl-terminated polysiloxane that has not bee incorporated into the block copolymer.

The monomer composition comprises the hydroxyaryl-terminated polysiloxane in an amount of about 2 to about 10 weight percent, specifically about 3 to about 7 weight percent, more specifically about 4 to about 6 weight percent, based on the total weight of the monomer composition. When the hydroxyaryl-terminated polysiloxane amount is less than about 2 weight percent, the flame retardancy advantages of the thermoplastic composition are diminished. When the hydroxyaryl-terminated polysiloxane amount is greater than about 10 weight percent, the solubility of the thermoplastic composition in aromatic hydrocarbon solvents can be undesirably reduced.

The thermoplastic compositions of the present invention are prepared by oxidatively copolymerizing the monomer composition in an aromatic hydrocarbon solvent to form a solution comprising a poly(2,6-dimethyl-1,4-phenylene ether-co-2,3,6-trimethyl-1,4-phenylene ether), and a block copolymer comprising a poly(2,6-dimethyl-1,4-phenylene ether-co-2,3,6-trimethyl-1,4-phenylene ether) block and a polysiloxane block comprising, on average, about 10 to about 100 siloxane repeating units. The aromatic hydrocarbon solvent can be, for example, benzene, toluene, xylenes, or a mixture thereof. In some embodiments, the aromatic hydrocarbon solvent is toluene. The oxidative copolymerization is conducted in the presence of molecular oxygen and a polymerization catalyst. The molecular oxygen can be provided, for example, in a purified form or as air. The polymerization catalyst can be a catalyst known for use in oxidative polymerization of phenols. For example, the polymerization catalyst can comprise a metal ion, such as copper ion or manganese ion, and at least one amine ligand. Suitable amine ligands include dialkylamines (such as di-n-butylamine), trialkylamines (such as dimethyl-n-butylamine), and alkylenediamines (such as N,N'-di-tert-butylethylenediamine). The polymerization catalyst can be prepared in situ by mixing a metal ion source (e.g., cuprous oxide) and the amine ligands.

In some embodiments, oxidatively copolymerizing the monomer composition comprises a monomer addition period characterized by a first temperature, a build period following the monomer addition period and characterized by a second temperature greater than the first temperature, and a temperature ramp period between the monomer addition period and the build period, wherein the temperature ramp period comprises increasing the temperature at an average rate of about 0.01 to about 0.35° C. per minute, specifically about 0.1 to about 0.3° C. per minute, more specifically about 0.15 to about 0.25° C. per minute. In some embodiments, the monomer addition period is about 60 to about 100 minutes, specifically about 70 to about 90 minutes. In some embodiments, the first temperature is about 35 to about 45° C., specifically about 37 to about 43° C. In some embodiments, the build period is about 5 to about 30 minutes, specifically about 8 to about 20 minutes. In some embodiments, the second temperature is about 55 to about 65° C., specifically about 57 to about 63° C. In some embodiments, the temperature ramp period is about 10 to about 30 minutes, specifically about 12 to about 25 minutes. In some embodiments, the total reaction time elapsed between the moment of oxygen introduction and the moment of oxygen cut-off is about 80 to about 150 minutes, specifically about 90 to about 130 minutes, more specifically about 100 to about 120 minutes. Specific conditions for oxidative copolymerization are described in the working examples below.

The oxidative copolymerization forms a solution comprising a poly(2,6-dimethyl-1,4-phenylene ether-co-2,3,6-trimethyl-1,4-phenylene ether); and a block copolymer comprising a poly(2,6-dimethyl-1,4-phenylene ether-co-2,3,6-trimethyl-1,4-phenylene ether) block, and a polysiloxane block comprising, on average, about 10 to about 100 siloxane repeating units. In some embodiments, the polysiloxane block comprises about 25 to about 70 siloxane repeating units, specifically about 30 to about 60 siloxane repeating units, more specifically about 35 to about 50 siloxane repeating units, still more specifically about 40 to about 50 siloxane repeating units. The number of siloxane repeating units in the polysiloxane block is essentially unaffected by the copolymerization and isolation conditions, and it is therefore equivalent to the number of siloxane repeating units in the hydroxyaryl-terminated polysiloxane starting material. When not otherwise known, the average number of siloxane repeating units per hydroxylaryl-terminate polysiloxane molecule can be determined by nuclear magnetic resonance methods that compare the intensity of signals associated with the siloxane repeating units to those associated with the hydroxyaryl terminal groups. For example, when the hydroxyaryl-terminated polysiloxane is a eugenol-capped polydimethylsiloxane, it is possible to determine the average number of siloxane repeating units by a proton nuclear magnetic resonance ($^1$H NMR) method in which integrals for the protons of the dimethylsiloxane resonance and the protons of the eugenol methoxy group are compared.

After the termination of oxidative copolymerization, the reaction mixture can be treated with a chelant to remove the polymerization catalyst metal. Suitable chelants include aminopolycarboxylic acids (such as nitrilotriacetic acid), alkylenediaminetetracarboxylic acids (such as ethylenediaminetetraacetic acid), alkali metal salts of the foregoing acids, and combinations thereof. In some embodiments, treating the reaction mixture with the chelant can be conducted for about 30 to about 120 minutes, specifically about 40 to about 90 minutes, at a temperature of about 40 to about 80° C., specifically about 50 to about 70° C. After contacting the reaction mixture with the chelant, an aqueous phase comprising the chelated catalyst metal is physically separated from an organic phase comprising the thermoplastic composition. The separation can be effected, for example, by gravity separation and decantation, or by liquid-liquid centrifugation.

The poly(2,6-dimethyl-1,4-phenylene ether-co-2,3,6-trimethyl-1,4-phenylene ether) and the block copolymer comprising a poly(2,6-dimethyl-1,4-phenylene ether-co-2,3,6-trimethyl-1,4-phenylene ether) block and a polysiloxane block can be isolated from solution by a method such as precipitation or devolatilizing extrusion. In the precipitation procedure, the solution comprising the poly(2,6-dimethyl-1,4-phenylene ether-co-2,3,6-trimethyl-1,4-phenylene ether) and the block copolymer is combined with an antisolvent. Suitable antisolvents include $C_1$-$C_6$ alkanols (such as methanol, ethanol, 1-propanol, 2-propanol, 1-butanol, 1-pentanol, and 1-hexanol), $C_3$-$C_6$ ketones (such as acetone and methyl ethyl ketone), and mixtures thereof. In some embodiments, the antisolvent comprises 2-propanol. One advantage of using 2-propanol as an antisolvent is that it is effective in dissolving residual hydroxyaryl-terminated polysiloxane. Thus, when the antisolvent comprises 2-propanol, the siloxane repeating units in the isolated thermoplastic composition consist essentially of the residue of hydroxyaryl-terminated polysiloxane that has been incorporated into the poly(phenylene ether)-polysiloxane block copolymer. Thus, by using a 2-propanol containing antisolvent, it is possible to produce a thermoplastic composition that comprises less than 1 weight percent, specifically less than 0.5 weight percent, more specifically less than 0.1 weight percent of residual hydroxyaryl-terminated polysiloxane.

The method provides efficient incorporation of hydroxyaryl-terminated polysiloxane into the block copolymer. And, as described above, siloxane units associated with any unincorporated hydroxyaryl-terminated polysiloxane can be removed from the thermoplastic composition by precipitation with an antisolvent comprising 2-propanol.

In a very specific embodiment of the method, the hydroxyaryl-terminated polysiloxane has the structure

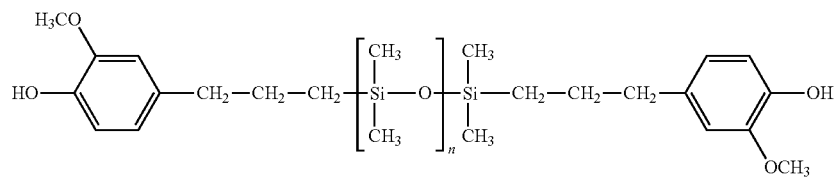

wherein n is about 35 to about 60; and the monomer composition comprises about 70 to about 88 weight percent of the 2,6-dimethylphenol, about 10 to about 22 weight percent of the 2,3,6-trimethylphenol, and about 3 to about 7 weight percent of the hydroxyaryl-terminated polysiloxane.

The invention includes the thermoplastic composition produced by the method. Thus, one embodiment is a thermoplastic composition, comprising: a poly(2,6-dimethyl-1,4-phenylene ether-co-2,3,6-trimethyl-1,4-phenylene ether); and a block copolymer comprising a poly(2,6-dimethyl-1,4-phenylene ether-co-2,3,6-trimethyl-1,4-phenylene ether) block, and a polysiloxane block comprising, on average, about 10 to about 100 siloxane repeating units; wherein the thermoplastic composition comprises about 65 to about 93 weight percent, specifically about 70 to about 88 weight percent, more specifically about 75 to about 84 weight percent of 2,6-dimethyl-1,4-phenylene ether units, about 5 to about 25 weight percent, specifically about 10 to about 22 weight percent, more specifically about 13 to about 19 weight percent, of 2,3,6-trimethyl-1,4-phenylene ether units, and about 2 to about 10 weight percent, specifically about 3 to about 7 weight percent, more specifically about 4 to about 6 weight percent of siloxane units; and wherein all weight percents are based on the total weight of the thermoplastic composition, unless a different weight basis is specified.

In the context of specifying about 65 to about 93 weight percent of 2,6-dimethyl-1,4-phenylene ether units, the term "2,6-dimethyl-1,4-phenylene ether units" includes all residues derived from 2,6-dimethylphenol, including internal 2,6-dimethyl-1,4-phenylene ether units having the structure

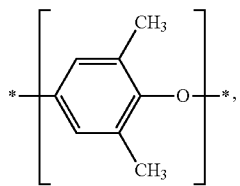

terminal 4-hydroxy-3,5-dimethylphenol ("head") groups having the structure

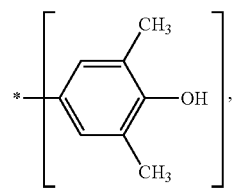

terminal 2,6-dimethylphenoxy ("tail") groups having the structure

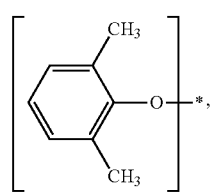

amino-substituted internal groups having the structures

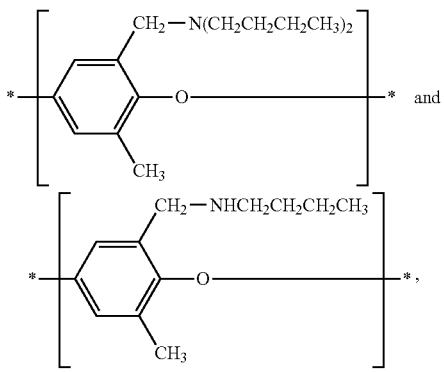

amino-substituted terminal groups having the structures

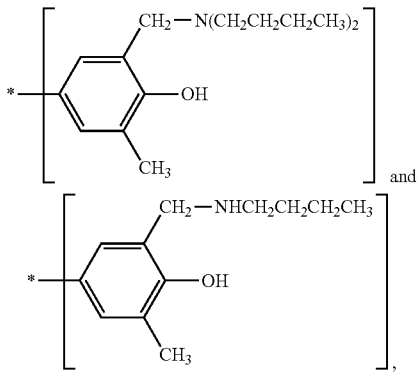

internal biphenyl groups having the structure

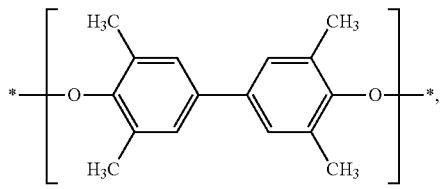

and
terminal biphenyl groups having the structure

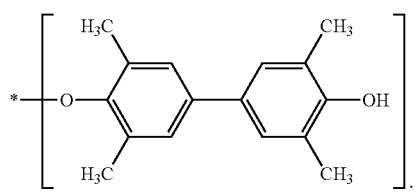

In the context of specifying about 5 to about 25 weight percent of 2,3,6-trimethyl-1,4-phenylene ether units, the term "2,3,6-trimethyl-1,4-phenylene ether units" includes all residues derived from 2,3,6-trimethylphenol, including internal 2,3,6-trimethyl-1,4-phenylene ether units having the structure

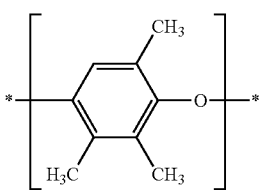

terminal 4-hydroxy-2,3,5-trimethylphenol ("head") groups having the structure

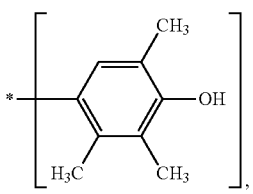

terminal 2,3,6-trimethylphenoxy ("tail") groups having the structure

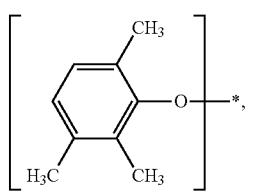

amino-substituted internal groups having the structures

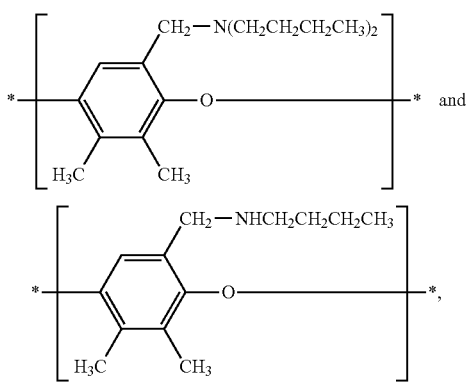

amino-substituted terminal groups having the structures

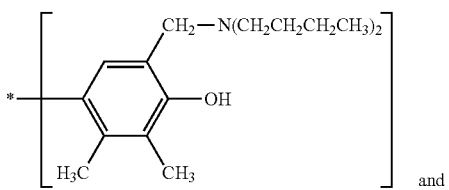

internal biphenyl groups having the structure

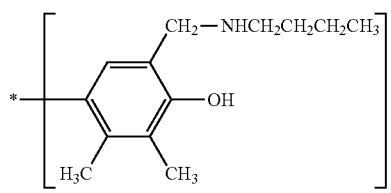

terminal biphenyl groups having the structure

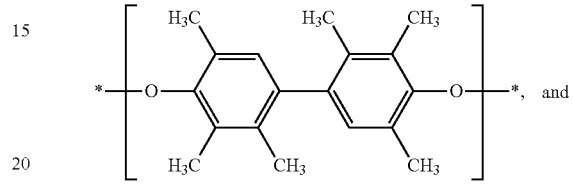

In the context of specifying about 2 to about 10 weight percent of siloxane units, the term "siloxane units" includes all units having the structure

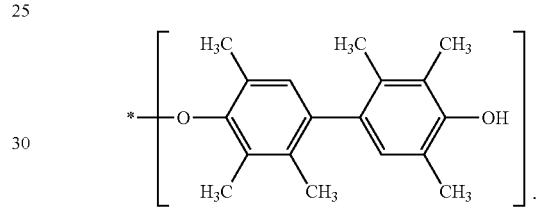

wherein each occurrence of $R^1$ and $R^2$ is independently hydrogen, $C_1$-$C_{12}$ hydrocarbyl, or $C_1$-$C_{12}$ halohydrocarbyl.

The thermoplastic composition comprises a poly(2,6-dimethyl-1,4-phenylene ether-co-2,3,6-trimethyl-1,4-phenylene ether). This polymer is a random copolymer of 2,6-dimethylphenol and 2,3,6-trimethylphenol, and it is a by-product of the block copolymer synthesis.

In addition to the poly(2,6-dimethyl-1,4-phenylene ether-co-2,3,6-trimethyl-1,4-phenylene ether), the thermoplastic composition comprises a block copolymer comprising a poly (2,6-dimethyl-1,4-phenylene ether-co-2,3,6-trimethyl-1,4-phenylene ether) block, and a polysiloxane block. The poly (2,6-dimethyl-1,4-phenylene ether-co-2,3,6-trimethyl-1,4-phenylene ether) block is the residue of oxidatively copolymerizing 2,6-dimethylphenol and 2,3,6-trimethylphenol.

The polysiloxane block is a residue of the hydroxyaryl-terminated polysiloxane. In some embodiments, the polysiloxane block comprises repeating units having the structure

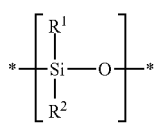

wherein each occurrence of $R^1$ and $R^2$ is independently hydrogen, $C_1$-$C_{12}$ hydrocarbyl, or $C_1$-$C_{12}$ halohydrocarbyl; and the polysiloxane block further comprises a unit having the structure

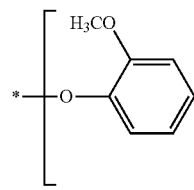

wherein Y is $C_1$-$C_{12}$, hydrocarbyl, $C_1$-$C_{12}$, hydrocarbyloxy, or halogen, and wherein each occurrence of $R^3$ and $R^4$ is independently hydrogen, $C_1$-$C_{12}$ hydrocarbyl, or $C_1$-$C_{12}$ halohydrocarbyl. In some embodiments, the polysiloxane repeating units comprise dimethylsiloxane ($—Si(CH_3)_2O—$) units. In some embodiments, the polysiloxane block has the structure

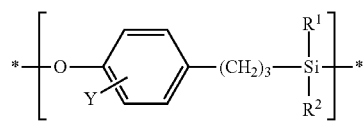

wherein n is about 10 to about 100, specifically about 20 to about 80, more specifically about 20 to about 60, even more specifically about 35 to about 60.

In some embodiments, at least 90 mole percent of the siloxane units in the thermoplastic composition are incorporated into the block copolymer.

In some embodiments, the thermoplastic composition has a weight average molecular weight of at least 50,000 atomic mass units. For example, the thermoplastic composition can have a weight average molecular weight of 50,000 to about 150,000 atomic mass units, specifically about 60,000 to about 130,000 atomic mass units, more specifically about 70,000 to about 120,000 atomic mass units. A specific procedure for the determination of weight average molecular weight is described in the working examples below.

In some embodiments, the thermoplastic composition has an intrinsic viscosity of about 0.3 to about 1.2 deciliters per gram, specifically about 0.4 to about 1.1 deciliters per gram, more specifically about 0.5 to about 1.0 deciliters per gram, yet more specifically about 0.6 to about 0.9 deciliters per gram. Intrinsic viscosity can be measured by Ubbelohde viscometer at 25° C. in chloroform, using a thermoplastic composition isolated by precipitation from 2-propanol.

A preferred embodiment is a thermoplastic composition, comprising: a poly(2,6-dimethyl-1,4-phenylene ether-co-2,3,6-trimethyl-1,4-phenylene ether); and a block copolymer comprising a poly(2,6-dimethyl-1,4-phenylene ether-co-2,3,6-trimethyl-1,4-phenylene ether) block, and a polysiloxane block; wherein the polysiloxane block has the structure

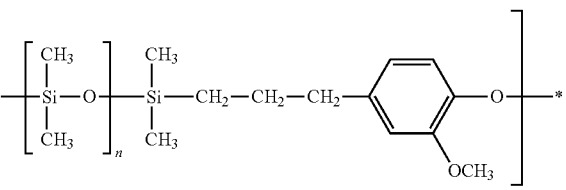

wherein n is about 35 to about 60; wherein the thermoplastic composition comprises about 75 to about 84 weight percent of 2,6-dimethyl-1,4-phenylene ether units, about 13 to about 19 weight percent of 2,3,6-trimethyl-1,4-phenylene ether units, and about 3 to about 7 weight percent of dimethylsiloxane units; and wherein all weight percents are based on the total weight of the thermoplastic composition, unless a different weight basis is specified.

The thermoplastic composition is useful for imparting flame retardancy to blends of the thermoplastic composition and other polymers. Such other polymers can include, for example, polystyrenes (including homopolystyrenes, rubber-modified polystyrenes, styrenic block copolymers, and hydrogenated styrenic block copolymers), polyamides (including, for example, polyamide-6 and polyamide-6,6), polyolefins (including, for example, polyethylenes, polypropylenes, polybutenes, and olefin copolymers), polyesters (including, for example, poly(ethylene terephthalate)s and poly(butylene terephthalate)s), and combinations thereof. Thus, one embodiment is a polymer blend, comprising: about 5 to about 95 weight percent, based on the weight of the polymer blend, of a polymer selected from the group consisting of polystyrenes, polyamides, polyolefins, polyesters, and combinations thereof; and about 5 to about 95 weight percent, based on the weight of the polymer blend, of a thermoplastic composition, comprising a poly(2,6-dimethyl-1,4-phenylene ether-co-2,3,6-trimethyl-1,4-phenylene ether), and a block copolymer comprising a poly(2,6-dimethyl-1,4-phenylene ether-co-2,3,6-trimethyl-1,4-phenylene ether) block and a polysiloxane block comprising, on average, about 10 to about 100 siloxane repeating units; wherein the thermoplastic composition comprises, based on the weight of the thermoplastic composition, about 65 to about 93 weight percent of 2,6-dimethyl-1,4-phenylene ether units, about 5 to about 25 weight percent of 2,3,6-trimethyl-1,4-phenylene ether units, and about 2 to about 10 weight percent of siloxane units. All

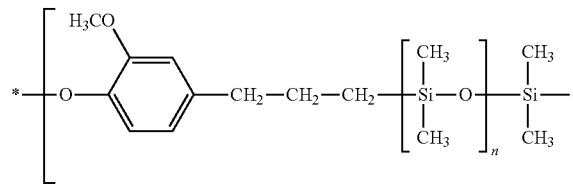

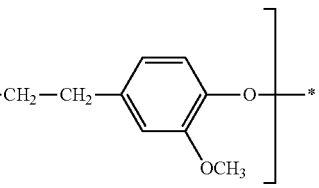

of the above-described variations of the thermoplastic composition are applicable as well to the polymer blend.

In a very specific embodiment of the polymer blend, the polysiloxane block comprises, on average, about 35 to about 60 siloxane repeating units; the polysiloxane block has the structure

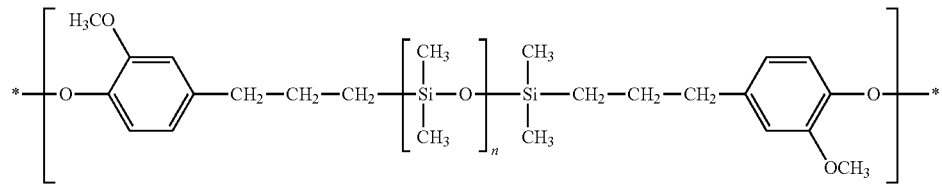

wherein n is about 35 to about 60; and the thermoplastic composition comprises, based on the weight of the thermoplastic composition, about 75 to about 84 weight percent of 2,6-dimethyl-1,4-phenylene ether units, about 13 to about 19 weight percent of 2,3,6-trimethyl-1,4-phenylene ether units, and about 3 to about 7 weight percent of dimethylsiloxane units.

The invention includes at least the following embodiments.

Embodiment 1

A thermoplastic composition, comprising: a poly(2,6-dimethyl-1,4-phenylene ether-co-2,3,6-trimethyl-1,4-phenylene ether); and a block copolymer comprising a poly(2,6-dimethyl-1,4-phenylene ether-co-2,3,6-trimethyl-1,4-phenylene ether) block, and a polysiloxane block comprising, on average, about 10 to about 100 siloxane repeating units; wherein the thermoplastic composition comprises about 65 to about 93 weight percent of 2,6-dimethyl-1,4-phenylene ether units, about 5 to about 25 weight percent of 2,3,6-trimethyl-1,4-phenylene ether units, and about 2 to about 10 weight percent of siloxane units; and wherein all weight percents are based on the total weight of the thermoplastic composition, unless a different weight basis is specified.

Embodiment 2

The thermoplastic composition of embodiment 1, wherein the thermoplastic composition comprises about 10 to about 22 weight percent of the 2,3,6-trimethyl-1,4-phenylene ether units.

Embodiment 3

The thermoplastic composition of embodiment 1 or 2, wherein the thermoplastic composition comprises about 13 to about 19 weight percent of the 2,3,6-trimethyl-1,4-phenylene ether units.

Embodiment 4

The thermoplastic composition of any of embodiments 1-3, wherein the polysiloxane block has the structure

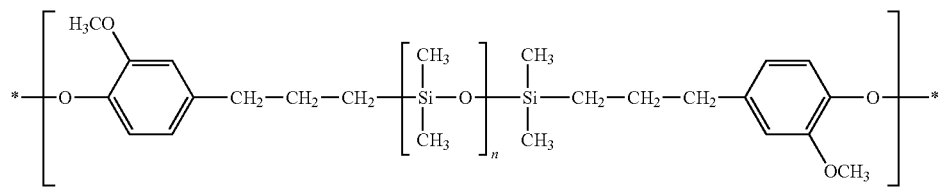

wherein n is about 35 to about 60.

Embodiment 5

The thermoplastic composition of any of embodiments 1-4, wherein at least 90 mole percent of the siloxane units are incorporated into the block copolymer.

Embodiment 6

The thermoplastic composition of embodiment 1, wherein the polysiloxane block comprises, on average, about 35 to about 60 siloxane repeating units; wherein the polysiloxane block has the structure

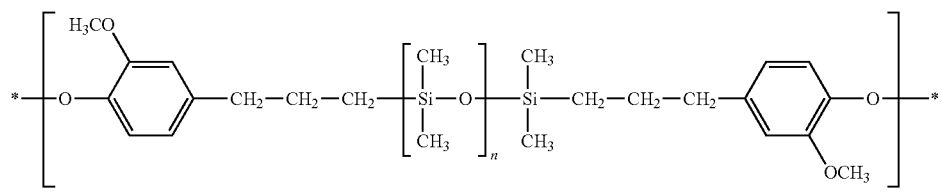

wherein n is about 35 to about 60; and wherein the thermoplastic composition comprises about 75 to about 84 weight percent of 2,6-dimethyl-1,4-phenylene ether units, about 13 to about 19 weight percent of 2,3,6-trimethyl-1,4-phenylene ether units, and about 3 to about 7 weight percent of dimethylsiloxane units.

Embodiment 6a

A thermoplastic composition, comprising: a poly(2,6-dimethyl-1,4-phenylene ether-co-2,3,6-trimethyl-1,4-phenylene ether); and a block copolymer comprising a poly(2,6-dimethyl-1,4-phenylene ether-co-2,3,6-trimethyl-1,4-phenylene ether) block, and a polysiloxane block; wherein the polysiloxane block has the structure

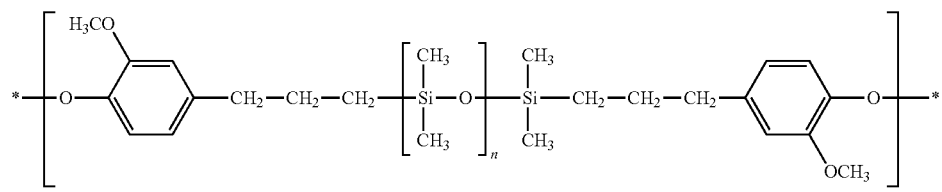

wherein n is about 35 to about 60; wherein the thermoplastic composition comprises about 75 to about 84 weight percent of 2,6-dimethyl-1,4-phenylene ether units, about 13 to about 19 weight percent of 2,3,6-trimethyl-1,4-phenylene ether units, and about 3 to about 7 weight percent of dimethylsiloxane units; and wherein all weight percents are based on the total weight of the thermoplastic composition, unless a different weight basis is specified.

Embodiment 7

A method of preparing a thermoplastic composition, comprising: oxidatively copolymerizing a monomer composition in an aromatic hydrocarbon solvent to form a solution comprising a poly(2,6-dimethyl-1,4-phenylene ether-co-2,3,6-trimethyl-1,4-phenylene ether); and a block copolymer comprising a poly(2,6-dimethyl-1,4-phenylene ether-co-2,3,6-trimethyl-1,4-phenylene ether) block, and a polysiloxane block comprising, on average, about 10 to about 100 siloxane repeating units; wherein the monomer composition comprises about 65 to about 93 weight percent of 2,6-dimethylphenol, about 5 to about 25 weight percent of 2,3,6-trimethylphenol, and about 2 to about 10 weight percent of a hydroxyaryl-terminated polysiloxane.

Embodiment 8

The method of embodiment 7, wherein the monomer composition comprises about 10 to about 22 weight percent of the 2,3,6-trimethylphenol.

Embodiment 9

The method of embodiment 7 or 8, wherein the monomer composition comprises about 13 to about 19 weight percent of the 2,3,6-trimethylphenol.

Embodiment 10

The method of any of embodiments 7-9, wherein the hydroxyaryl-terminated polysiloxane has the structure

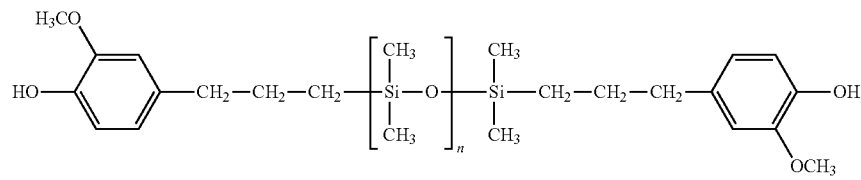

wherein n is about 35 to about 60.

Embodiment 11

The method of any of embodiments 7-10, wherein said oxidatively copolymerizing a monomer composition comprises a monomer addition period characterized by a first temperature, a build period following the addition period and characterized by a second temperature greater than the first temperature, and a temperature ramp period between the addition period and the build period; and wherein the temperature ramp period comprises increasing the temperature at an average rate of about 0.01 to about 0.35° C. per minute.

Embodiment 12

The method of any of embodiments 7-11, wherein the hydroxyaryl-terminated polysiloxane has the structure

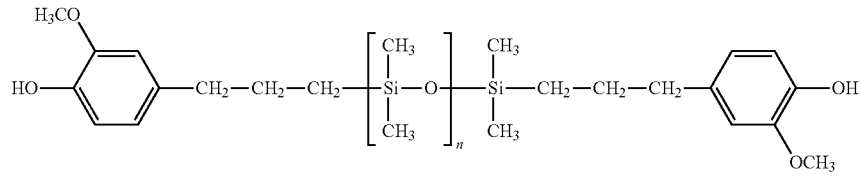

wherein n is about 35 to about 60; and wherein the monomer composition comprises about 70 to about 88 weight percent of the 2,6-dimethylphenol, about 10 to about 22 weight percent of the 2,3,6-trimethylphenol, and about 3 to about 7 weight percent of the hydroxyaryl-terminated polysiloxane.

Embodiment 13

A polymer blend, comprising: about 5 to about 95 weight percent, based on the weight of the polymer blend, of a polymer selected from the group consisting of polystyrenes, polyamides, polyolefins, polyesters, and combinations thereof; and about 5 to about 95 weight percent, based on the weight of the polymer blend, of a thermoplastic composition, comprising a poly(2,6-dimethyl-1,4-phenylene ether-co-2,3,6-trimethyl-1,4-phenylene ether); and a block copolymer comprising a poly(2,6-dimethyl-1,4-phenylene ether-co-2,3,6-trimethyl-1,4-phenylene ether) block, and a polysiloxane block comprising, on average, about 10 to about 100 siloxane repeating units; wherein the thermoplastic composition comprises, based on the weight of the thermoplastic composition, about 65 to about 93 weight percent of 2,6-dimethyl-1,4-phenylene ether units, about 5 to about 25 weight percent of 2,3,6-trimethyl-1,4-phenylene ether units, and about 2 to about 10 weight percent of siloxane units.

Embodiment 14

The polymer blend of embodiment 13, wherein the polysiloxane block comprises, on average, about 35 to about 60 siloxane repeating units; wherein the polysiloxane block has the structure

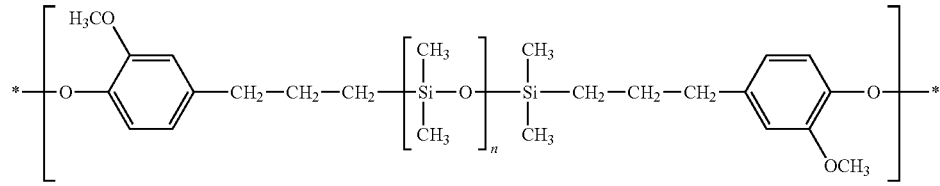

wherein n is about 35 to about 60; and wherein the thermoplastic composition comprises, based on the weight of the thermoplastic composition, about 75 to about 84 weight percent of 2,6-dimethyl-1,4-phenylene ether units, about 13 to about 19 weight percent of 2,3,6-trimethyl-1,4-phenylene ether units, and about 3 to about 7 weight percent of dimethylsiloxane units.

The invention is further illustrated by the following non-limiting examples.

Examples 1 and 2, Comparative Examples 1-8

These examples illustrate the preparation and characterization of inventive copolymers of 2,6-dimethylphenol, 2,3,6-trimethylphenol, and hydroxyaryl-terminated polysiloxane, as well as comparative 2,6-dimethylphenol homopolymers, copolymers of 2,6-dimethylphenol and 2,3,6-trimethylphenol, and copolymers of 2,6-dimethylphenol and hydroxyaryl-terminated polysiloxane.

For Examples 1 and 2, and Comparative Examples 1, 4, 5, 7, and 8, reactions were conducted in a 1.8 liter RC1 lab reactor. For Comparative Examples 2, 3, and 6, reactions were conducted in a commercial-scale reactor.

The following materials were used in the synthesis of the poly(phenylene ether)-polysiloxane block copolymers: 2,6-dimethylphenol and 2,3,6-trimethylphenol were obtained from SABIC Innovative Plastics LLP; N,N-dimethyl-n-butylamine (DMBA), N,N'-di-tert-butylethylenediamine (DBEDA), and di-n-butylamine (DBA) were obtained from Celanese Ltd.; cuprous oxide ($Cu_2O$) was obtained from American Chemet Corporation; a phase transfer agent was obtained as MAQUAT 4450T from Mason Chemical Company; hydrobromic acid (HBr) was obtained from Diaz Chemical Corporation; toluene was obtained from Ashland Inc.; trisodium nitrilotriacetate (NTA) was obtained from Akzo Nobel Functional Chemicals LLC; a eugenol-capped polysiloxane having, on average, 45 dimethylsiloxane repeat units was obtained from Momentive Performance Materials.

The process variations are summarized in Table 1, where "Toluene source" refers to whether the toluene solvent is fresh or recycled from a commercial process for poly(2,6-dimethyl-1,4-phenylene ether) (2,6-dimethylphenol homopolymer) synthesis; "Solids (%)" is the total weight of 2,6-dimethylphenol, 2,3,6-trimethylphenol, and eugenol-capped polysiloxane, expressed as a weight percent relative to the sum of the weights of 2,6-dimethylphenol, 2,3,6-trimethylphenol, eugenol-capped polysiloxane, and toluene; "Polysiloxane loading (%)" is the weight percent of eugenol-capped polysiloxane in the monomer mixture, based on the total weight of the eugenol-capped polysiloxane, 2,6-dimethylphenol, and 2,3,6-trimethylphenol; "2,3,6-TMP loading (%)" is the weight percent of 2,3,6-trimethylphenol in the monomer mixture, based on the total weight of the eugenol-capped polysiloxane, 2,6-dimethylphenol, and 2,3,6-trimethylphenol; "Catalyst (Cu:Monomer)" is the mole ratio of copper to the total moles of eugenol-capped polysiloxane, 2,6-dimethylphenol, and 2,3,6-trimethylphenol; "Temp., addition (° C.)" is the reaction temperature, expressed in degrees centigrade, during addition of 2,6-dimethylphenol, with all of the eugenol-capped polysiloxane and 2,3,6-trimethylphenol having been present in the reaction vessel before initiation of the reaction; "Temp., build (° C.)" is the temperature, expressed in degrees centigrade, during the build phase of the reaction; "Reaction time (min)" is the total reaction time, expressed in minutes, elapsed between the moment of oxygen introduction and the moment of oxygen cut-off. For all variations, the controlled monomer addition time is 40 to 80 minutes from the start of reaction (that is, from the initiation of oxygen flow). Build time is measured from the beginning of the temperature ramp period to the end of reaction (that is, to the termination of oxygen flow); build time was varied between 30 and 110 minutes.

The process variations summarized in Table 1 were superimposed on the following general synthetic procedure. The reactor was purged with nitrogen ($N_2$) via the dip tube later used for oxygen introduction. There was also a separate nitrogen inlet to adjust the nitrogen content in the reactor. An addition pot was loaded with a monomer solution containing 41.5 weight percent 2,6-dimethylphenol, 8.5 weight percent 2,3,6-trimethylphenol, and 50 weight percent toluene, and the headspace of the addition funnel was purged with nitrogen. The temperatures of the addition pot and its contents were adjusted to 50° C. using an ethylene glycol bath. The reactor was washed with 60° C. toluene while the nitrogen purge of the reactor was continued. The reactor was charged with 10% of the monomer solution from the addition pot, as well as 100% of the eugenol-capped polysiloxane. The addition flask used to add the eugenol-capped polysiloxane was flushed with a small volume of toluene, which was then added to the reactor. The reactor was then charged with a catalyst ligand solution containing di-n-butylamine (3.5 weight percent, relative to total monomer), dimethyl-n-butylamine (3.9 weight percent, relative to total monomer), N,N'-di-tert-butylethylenediamine (0.26 weight percent, relative to total monomer), and phase transfer agent (0.07 weight percent, relative to total monomer). The addition flask used to add the catalyst ligand solution was flushed with a small volume of toluene, which was then added to the reactor. The reactor was then charged with a copper solution containing all the required $Cu_2O$ and HBr (10.7 grams per gram $Cu_2O$), which had been pre-mixed. The addition flask used to add the copper solution was flushed with a small volume of toluene, which was then added to the reactor. The reactor was then charged with the remaining toluene required. Addition of the remaining monomer (2,6-dimethylphenol and 2,3,6-trimethylphenol) solution and oxygen addition were started and the temperature was maintained at the value shown in the Table 1 row labeled "Temp., addition (° C.)". Starting after complete addition of 2,6-dimethylphenol, the temperature of the reaction vessel was gradually raised to the value shown in the Table 1 row labeled "Temp., build (° C.)". This temperature ramp to the build temperature was started at "Time of temp. ramp start (min)" and ended at "Time build temp. reached (min)" in Table 1. During the temperature adjustment phase and the constant temperature phase that followed, the oxygen flow was adjusted (typically, reduced) as necessary to maintain a headspace oxygen concentration of 18%. The reaction was continued until a desired time point was reached. This time point was predetermined with other experiments and was intended to ensure maximum siloxane incorporation and target intrinsic viscosity and was generally 80 to 160 minutes after starting addition of 2,6-dimethylphenol. Once this time point was reached, the oxygen flow was stopped. The reaction mixture and headspace were then purged with nitrogen. The total reaction time was the time elapsed between initiation and termination of oxygen flow. The reaction mixture was transferred to a glass vessel for chelation and separation of the polymerization catalyst. The chelation step utilized 1.8 to 2.0 moles of trisodium nitrilotriacetate per mole of copper ion, where the trisodium nitrilotriacetate was provided as a 40 weight percent solution in water. The combined reaction mixture and chelant solution were stirred and maintained at 60° C. for one hour. The mixture was then phase separated using a separatory funnel or a liquid/liquid centrifuge to yield a heavy (aqueous) fraction that was discarded and a light (organic) fraction containing the block copolymer reaction product (i.e., the thermoplastic composition). Use of the chelant solution typically resulted in a product having a residual catalyst metal concentration of 1 to 50 parts per million by weight, specifically 1 to 20 parts by million by weight, based on the dry weight of the isolated powder. The product was isolated via precipitation with methanol or isopropanol in a weight ratio of polymer solution to alcohol of 1:2 to 1:3, followed by filtration and drying of the filtrate under partial vacuum with nitrogen bleed at 110° C. overnight. The final powder typically had a residual toluene concentration of 50 parts per million by weight to 1 weight percent. Polysiloxane-containing samples used for intrinsic viscosity and molecular weight characterization, as reported in Table 2, were precipitated from methanol. Polysiloxane-containing samples used for $^1$H NMR analysis, as reported in Table 4, were precipitated from isopropanol. Samples that did not utilize polysiloxane in the preparation were precipitated from methanol. In Table 1, Comparative Examples 2 and 3 are 2,6-dimethylphenol homopolymers having intrinsic viscosities of 0.46 and 0.40 deciliter per gram, commercially produced by SABIC Innovative Plastics. Comparative Example 6 is a copolymer of 2,6-dimethylphenol and 2,3,6-trimethylphenol commercially produced by SABIC Innovative Plastics.

TABLE 1

|  | C. Ex. 1 | C. Ex. 2 | C. Ex 3 | C. Ex. 4 | C. Ex. 5 |
| --- | --- | --- | --- | --- | --- |
| Toluene source | Fresh | Recycled | Recycled | Fresh | Fresh |
| Solids (%) | 20 | — | — | 23 | 20 |
| Polysiloxane loading (%) | 0 | 0 | 0 | 5 | 5 |
| 2,3,6-TMP loading (%) | 0 | 0 | 0 | 0 | 0 |
| Catalyst (Cu:Monomer) | 1:800 | — | — | 1:700 | 1:930 |
| Temp., addition (° C.) | 40 | — | — | 40 | 40 |
| Temp., build (° C.) | 45 | — | — | 45 | 45 |
| Time of temp. ramp start (min) | 75 | — | — | 75 | 75 |
| Time build temp. reached (min) | 86 | — | — | 86 | 86 |
| Reaction time (min) | 115 | — | — | 110 | 110 |

TABLE 1-continued

|  | C. Ex. 6 | C. Ex. 7 | C. Ex. 8 | Ex. 1 | Ex. 2 |
|---|---|---|---|---|---|
| Toluene source | Recycled | Fresh | Fresh | Fresh | Fresh |
| Solids (%) | — | 20 | 20 | 20 | 20 |
| Polysiloxane loading (%) | 5 | 0 | 0 | 5 | 5 |
| 2,3,6 TMP loading (%) | 0 | 17.1 | 17.1 | 16.3 | 16.3 |
| Catalyst (Cu:Monomer) | — | 1:958 | 1:1047 | 1:913 | 1:999 |
| Temp., addition (° C.) | — | 38.2 | 38.2 | 38.2 | 38.2 |
| Temp., build (° C.) | — | 60 | 60 | 60 | 60 |
| Time of temp. ramp start (min) | — | 83 | 83 | 83 | 83 |
| Time build temp. reached (min) | — | 100 | 100 | 100 | 100 |
| Reaction time (min) | — | 112 | 112 | 112 | 112 |

The properties of resulting products (i.e., thermoplastic compositions) are summarized in Tables 2-4. In Table 2, "DMP Homopolymer" refers to homopolymer of 2,6-dimethylphenol; "DMP-D45 Copolymer" refers to copolymer of 2,6-dimethylphenol and a hydroxyaryl-terminated polysiloxane having approximately 45 siloxane repeating units; "DMP-TMP Copolymer" refers to copolymer of 2,3,6-trimethylphenol and a hydroxyaryl-terminated polysiloxane having approximately 45 siloxane repeating units; "DMP-TMP-D45 Copolymer" refers to copolymer of 2,6-dimethylphenol, 2,3,6-trimethylphenol, and a hydroxyaryl-terminated polysiloxane having approximately 45 siloxane repeating units.

Also in Table 2, "IV (dL/g)" is the intrinsic viscosity, expressed in deciliters per gram and measured by Ubbelohde viscometer at 25° C. in chloroform. Number average molecular weight and weight average molecular weight were determined by gel permeation chromatography as follows. The gel permeation chromatograph was calibrated using twelve polystyrene standards, each of narrow molecular weight distribution, and collectively spanning a molecular weight range of 1,000 to 1,000,000 grams/mole. The columns used were 1,000 and 100,000 angstrom PLgel columns with a 5 microliter 100 angstrom PLgel guard column. The elution liquid was chloroform with 100 parts per million by weight di-n-butylamine. The elution flow was 1.5 milliliters per minute. The detector wavelength was 254 nanometers. A third degree polynomial function was fitted through the calibration points. Experimental samples were prepared by dissolving 0.01 gram of isolated solid thermoplastic composition in 20 milliliters chloroform. A 50 microliter sample of the resulting solution was injected into the chromatograph. The values of number average molecular weight (MO and weight average molecular weight ($M_w$) were calculated from the measured signal using the polystyrene calibration line. The values were subsequently converted from polystyrene molecular weight to poly(2,6-dimethyl-1,4-phenylene ether) molecular weights using the formula: $M(PPE)=0.3122 \times M(PS)^{1.073}$, where M(PPE) is poly(2,6-dimethyl-1,4-phenylene ether) molecular weight and M(PS) is polystyrene molecular weight. The Table 2 intrinsic viscosity and molecular weight results show that the Example 1 and 2 copolymers of 2,6-dimethylphenol, 2,3,6-trimethylphenol, and hydroxyaryl-terminated polysiloxane have similar intrinsic viscosities and molecular weights to the Comparative Example 4-6 copolymers of 2,6-dimethylphenol and hydroxyaryl-terminated polysiloxane.

Proton nuclear magnetic resonance spectroscopy ($^1$H NMR) was used to determine the weight percent hydroxyaryl-terminated polysiloxane residues ("Si (wt %)" in Table 2) and weight percent 2,3,6-trimethyl-1,4-phenylene ether units ("TMP (wt %)"), based on the total weight of hydroxyaryl-terminated polysiloxane residues, 2,6-dimethyl-1,4-phenylene ether units, 2,3,6-trimethyl-1,4-phenylene ether units, 2-(di-n-butylaminomethyl)-3,6-dimethyl-1,4-phenylene ether residues, 2,6-dimethylphenoxy units, and 2,2',6,6'-tetramethylbiphenyl units in the isolated product.

The $^1$H NMR determination of weight percent hydroxyaryl-terminated polysiloxane residues uses protons labeled a-g in the structures labeled Formula (I) through Formula (V) below, and is calculated as $$\text{Weight \% Siloxane\_in\_product} = \frac{X}{X+Y+Z+T+U+V+W} \times 100$$

where $$X = \frac{\text{Peak ``}b\text{'' Integral@}0.07\text{ ppm} \times \text{Mn Siloxane Fluid}}{270},$$

$$Y = \frac{\text{Peak ``}a\text{'' Integral@}6.47\text{ ppm} \times \text{MW 2,6DMPE}}{2},$$

$$Z = \frac{\text{Peak ``}c\text{'' Integral@}6.06\text{ ppm} \times \text{MW 2, 3, 6trimethylphenol}}{1},$$

$$T = \frac{\text{Peak ``}f\text{'' Integral@}3.33\text{ ppm} \times \text{MW int DBA}}{4},$$

$$U = \frac{\text{Peak ``}g\text{'' Integral@}3.61\text{ ppm} \times \text{MW term DBA}}{4},$$

$$V = \frac{\text{Peak ``}e\text{'' Integral@}7.09\text{ ppm} \times \text{MW2,6DMP}}{3},$$

and $$W = \frac{\text{Peak ``}d\text{'' Integral@}7.35\text{ ppm} \times \text{MW biphenyl}}{4}.$$

The denominators in the expressions for X, Y, Z, T, U, V, and W are the number of protons per molecule giving rise to the integrated peak. "Mn Siloxane Fluid" in the equation for X is the molecular weight of the hydroxyaryl-terminated polysiloxane (3798 atomic mass units). "MW 2,6DMPE" in the equation for Y is the molecular weight of 2,6-dimethyl-1,4-phenylene ether (120 atomic mass units). "MW2,3,6-trimethylphenol" in the equation for Z is the molecular weight of 2,3,6-trimethyl-1,4-phenylene ether (134 atomic mass units). "MWintDBA" in the equation for T is the molecular weight of the di-n-butylamino-substituted internal 2,6-dimethyl-1,4-phenylene ether unit, i.e., the 2-(di-n-butylaminomethyl)-6-methyl-1,4-phenylene ether unit (247 atomic mass units). "MWtermDBA" in the equation for U is the molecular weight of the di-n-butylamino-substituted terminal 3,5-dimethyl-4-hydroxyphenyl unit, i.e., the 3-(di-n-butylaminomethyl)-5-methyl-4-hydroxyphenyl unit (248 atomic mass units). "MW2,6DMP" in the equation for V is the molecular weight of a 2,6-dimethylphenoxy group (121 atomic mass units). "MWbiphenyl" in the equation for W is the molecular weight of a 3,3',5,5'-tetramethyl-4,4'-biphenol residue (240 atomic mass units). Note that in Formula (I), there is a quasi-random distribution of 2,6-dimethyl-1,4-phenylene ether units and 2,3,6-trimethyl-1,4-phenylene ether units, rather than separate blocks of 2,6-dimethyl-1,4-phenylene ether units and 2,3,6-trimethyl-1,4-phenylene ether units. Also note that in Formula (I) one occurrence of "m" can be zero provided that the other occurrence of "m" is not zero; and one occurrence of "n" can be zero provided that the other occurrence of "m" is not zero. Calling this metric "Weight % siloxane in product" is an oversimplification in that it neglects isolated product constituents other than hydroxyaryl-terminated polysiloxane residues, 2,6-dimethyl-1,4-phenylene ether units, 2,3,6-trimethyl-1,4-phenylene ether units, 2-(di-n-butylaminomethyl)-3,6-dimethyl-1,4-phenylene ether residues, 2,6-dimethylphenoxy "tail" units, and 2,2',6,6'-tetramethylbiphenyl units. Nevertheless, it is a useful metric.

The $^1$H NMR determination of weight percent 2,3,6-trimethyl-1,4-phenylene ether units similarly uses protons labeled a-g in the structures labeled Formula (I) through Formula (V) below, and is calculated as $$\text{Weight \% TMP\_in\_product} = \frac{Z}{X+Y+Z+T+U+V+W} \times 100$$

where X, Y, Z, T, U, V, and W are calculated as above.

The Table 2, Example 1 and 2 results for weight percent polysiloxane units and weight percent 2,3,6-trimethyl-1,4-phenylene ether units show that these units are incorporated into the reaction product in approximately the same proportion in which they were included in the monomer mixture.

Also in Table 2 is the glass transition temperature, expressed in degrees centigrade, of the isolated reaction product ("$T_g$ (° C.)"). Glass transition temperature was determined using a TA Instruments Q2000 differential scanning calorimeter, a temperature ramp from 30 to 300° C. at 20° C./minute, and a helium purge; the reported glass transition temperature, $T_g$, was taken as the midpoint of the transition. The glass transition temperature results show that the Example 1 and 2 copolymers of 2,6-dimethylphenol, 2,3,6-trimethylphenol, and hydroxyaryl-terminated polysiloxane have significantly higher glass transition temperatures than the Comparative Examples 4-6 copolymers of 2,6-dimethylphenol and hydroxyaryl-terminated polysiloxane, and the Comparative Examples 1-3 homopolymers of 2,6-dimethylphenol. Thus, the addition of 2,3,6-trimethylphenol to the monomer mixture increases the glass transition temperature of the resulting copolymer.

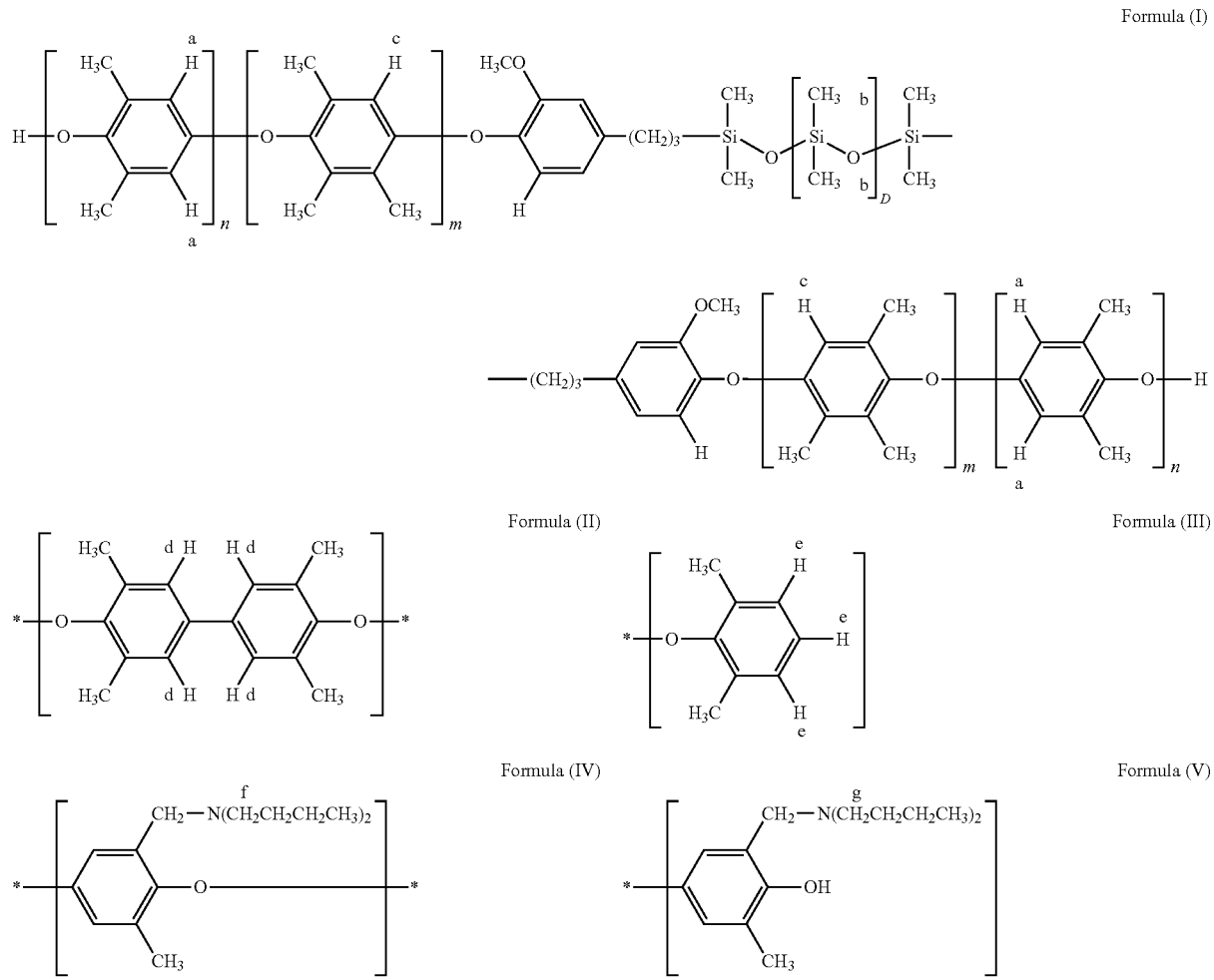

Formula (I)

Formula (II)

Formula (III)

Formula (IV)

Formula (V)

TABLE 2

| Sample | IV (dL/g) | GPC $M_n$ | GPC $M_w$ | ¹H NMR Si (wt %) | ¹H NMR TMP (wt %) | DSC $T_g$ (° C.) |
|---|---|---|---|---|---|---|
| DMP Homopolymer | | | | | | |
| C. Ex. 1 | 0.545 | 21,600 | 71,700 | — | — | 217.49 |
| C. Ex. 2 | 0.46 | 21,700 | 68,600 | — | — | 218.32 |
| C. Ex. 3 | 0.40 | 19,900 | 56,200 | — | — | 217.12 |
| DMP-D45 Copolymer | | | | | | |
| C. Ex. 4 | 0.67 | 24,700 | 102,100 | 5.25 | — | 214.58 |
| C. Ex. 5 | 0.465 | 19,000 | 58,100 | 5.08 | — | 212.95 |
| C. Ex. 6 | 0.409 | 17,900 | 51,700 | 5.07 | — | 213.3 |
| DMP-TMP Copolymer | | | | | | |
| C. Ex. 7 | 0.623 | 21,700 | 85,600 | — | 16.57 | 225.09 |
| C. Ex. 8 | 0.599 | 21,600 | 80,300 | — | 16.95 | 225.89 |
| DMP-TMP-D45 Copolymer | | | | | | |
| Ex. 1 | 0.708 | 23,000 | 87,700 | 5.14 | 15.68 | 219.95 |
| Ex. 2 | 0.65 | 23,600 | 93,600 | 5.26 | 15.65 | 221.04 |

Table 3 summarizes analysis of different types of phenolic groups in the isolated reaction products. Phenolic groups were analyzed by ³¹P NMR after phosphorus derivatization of the phenolic hydroxyl groups of the isolated sample as described in K. P. Chan et al., "Facile Quantitative Analysis of Hydroxyl End Groups of Poly(2,6-dimethyl-1,4-phenylene oxide)s by ³¹P NMR Spectroscopy", *Macromolecules*, volume 27, pages 6371-6375 (1994). For a given row in Table 3, the values without parentheses are the weight percent of each phenolic group type based on the total weight of phenolic groups, and the values in parentheses are the parts per million by weight of the phenolic group based on the total weight of the sample. In Table 3, "2,6 Head" refers to 4-hydroxy-3,5-dimethylphenyl groups, i.e., groups having the structure

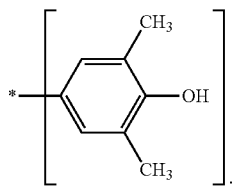

"Mono BA" refers to 4-hydroxy-3-methyl-5-(n-butylaminomethyl)phenyl groups, i.e., groups having the structure

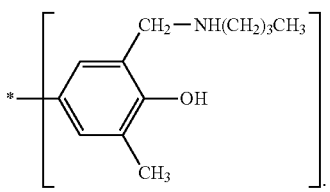

"Mannich DBA" refers to 4-hydroxy-3-methyl-5-(di-n-butylaminomethyl)phenyl groups, i.e., groups having the structure

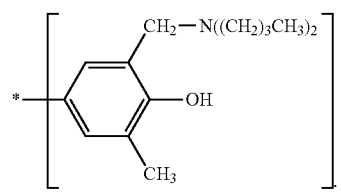

"Sal Ald" refers to a salicyl aldehyde or 4-hydroxy-3-formylphenyl groups, i.e., groups having the structure

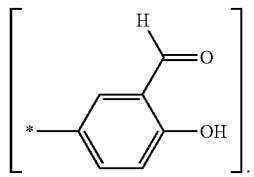

"Biph" refers to 2,6-dimethyl-4-(4-hydroxy-3,5-dimethylphenyl)phenyl groups, i.e., groups having the structure

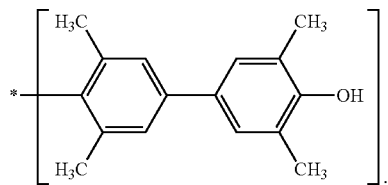

"Eug" refers to 3-(3-methoxy-4-hydroxyphenyl)propyl groups, i.e., groups having the structure,

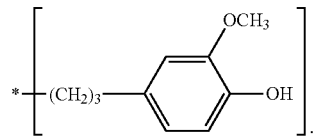

"2,3,6 Head" refers to 4-hydroxy-2,3,5-trimethylphenyl groups, i.e., groups having the structure

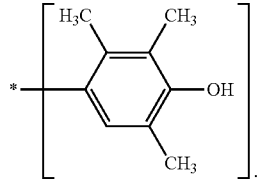

The phenolic group analysis results in Table 3 show that the concentration of eugenol terminal groups is only slightly lower than the concentration of the siloxane comonomer in the monomer composition, whereas the concentration of 2,3,6 Head groups is much lower than the concentration of 2,3,6-trimethylphenol in the monomer composition. This suggests that 2,3,6-trimethylphenol is preferentially incorporated into internal units of the polymer chain. Although a small amount of 3-(3-methoxy-4-hydroxyphenyl)propyl groups (eugenol residues) was detected for Comparative Example 1, this is an error, as no 3-(3-methoxy-4-hydroxyphenyl)propyl groups (eugenol groups) were present in the reaction mixture.

TABLE 3

| | | | | 31P NMR | | | |
|---|---|---|---|---|---|---|---|
| Sample | 2,6 Head | Mono BA | Mannich DBA | Sal Ald | Biph | Eug | 2,3,6 Head |
| *DMP Homopolymer* | | | | | | | |
| C. Ex. 1 | 55.1 (716.4) | 6.2 (80.6) | 30.9 (402.8) | 3.5 (45.6) | 3.3 (42.9) | 0.9 (11.2) | 0 (0) |
| C. Ex. 2 | 55.3 (873.9) | 4.5 (70.9) | 36.1 (571.5) | 0.8 (13.0) | 3.3 (52.2) | 0 (0) | 0 (0) |
| C. Ex. 3 | 53.6 (947.9) | 2.6 (46.6) | 40.2 (711.9) | 0.6 (11.5) | 2.9 (51.5) | 0 (0) | 0 (0) |
| *DMP-D45 Copolymer* | | | | | | | |
| C. Ex. 4 | 54.5 (681.9) | 4.3 (54.3) | 27.0 (337.8) | 6.2 (77.4) | 3.1 (39.2) | 4.8 (59.8) | 0 (0) |
| C. Ex. 5 | 52.1 (802.7) | 5.4 (82.5) | 33.9 (521.8) | 1.7 (26.9) | 2.8 (43.4) | 4.1 (63.7) | 0 (0) |
| C. Ex. 6 | 52.6 (986.5) | 3.1 (58.0) | 35.9 (673.8) | 1.2 (22.9) | 3.3 (61.8) | 3.9 (72.1) | 0 (0) |
| *DMP-TMP Copolymer* | | | | | | | |
| C. Ex. 7 | 52.0 (583.6) | 10.5 (118.1) | 28.3 (317.6) | 0.5 (6.1) | 2.8 (31.6) | 0 (0) | 5.8 (65.3) |
| C. Ex. 8 | 45.6 (523.1) | 11.9 (136.2) | 34.2 (392.2) | 0 (0) | 3.4 (38.8) | 0 (0) | 4.9 (55.6) |
| *DMP-TMP-D45 Copolymer* | | | | | | | |
| Ex. 1 | 46.4 (532.2) | 7.9 (90.9) | 31.5 (360.9) | 0.8 (8.7) | 3.3 (37.3) | 4.7 (53.5) | 5.5 (63.6) |
| Ex. 2 | 45.4 (506.3) | 8.3 (93.0) | 32.0 (356.4) | 0.8 (9.3) | 3.5 (39.3) | 4.6 (50.9) | 5.3 (59.1) |

Table 4 summarizes results for $^1$H NMR analyses of molecules in the isolated products. Weight percent weight percent hydroxyaryl-terminated polysiloxane residues ("Si" in Table 4) and weight percent 2,3,6-trimethyl-1,4-phenylene ether units ("TMP") were determined as described above in the context of Table 2. However, recall that the polysiloxane-containing samples used to generate the Table 2 results were precipitated from methanol, whereas the polysiloxane-containing samples used to generate the Table 4 results were precipitated from isopropanol (which effectively removes free hydroxyaryl-terminated polysiloxane). In Table 4, "Biph" refers to the weight percent of 3,3',5,5'-tetramethyl-4,4'-biphenol residues, that is, residues having the structure

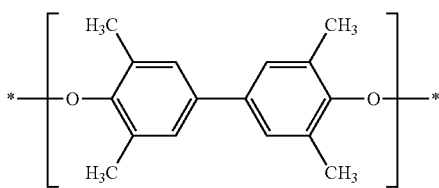

relative to the total weight of hydroxyaryl-terminated polysiloxane residues, 2,6-dimethyl-1,4-phenylene ether units, 2,3,6-trimethyl-1,4-phenylene ether units, 2-(di-n-butylaminomethyl)-3,6-dimethyl-1,4-phenylene ether residues, 2,6-dimethylphenoxy "tail" units, and 3,3',5,5'-tetramethyl-4,4'-biphenol residues. "Biph" is determined by $^1$H NMR using the "biphenyl" protons labeled d in the structure labeled "Formula (II)" above, and calculated as $$\% \text{ Biphenyl} = \frac{W}{X + Y + Z + T + U + V + W} \times 100$$

where X, Y, Z, T, U, V, and W are calculated as above.

In Table 4, "Tail" refers to the weight percent of 2,6-dimethylphenoxy groups, that is, groups having the structure

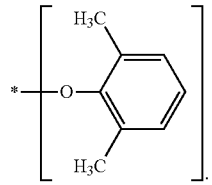

"Tail" is determined by $^1$H NMR using the "tail" protons labeled e in the structure labeled "Formula (III)" above, and calculated as $$\% \text{ Tail} = \frac{V}{X+Y+Z+T+U+V+W} \times 100$$

where X, Y, Z, T, U, V, and W are calculated as above.

In Table 4, "Ext Man" refers to the weight percent of "External Mannich" or terminal 4-hydroxy-3-methyl-5-(di-n-butylaminomethyl)phenyl groups. "Ext Man" is determined by $^1$H NMR using the protons labeled g in the structure labeled Formula (V) above, and calculated as $$\% \text{ ExtMan} = \frac{T}{X+Y+Z+T+U+V+W} \times 100$$

where X, Y, Z, T, U, V, and W are calculated as above.

In Table 4, "Int Man" refers to the weight percent of "Internal Mannich" or 2-methyl-6-(n-butylaminomethyl)-1,4-phenylene ether groups. "Int Man" is determined by $^1$H NMR using the protons labeled f in the structure labeled Formula (IV) above, and calculated as $$\% \text{ IntMan} = \frac{U}{X+Y+Z+T+U+Y+Z} \times 100$$

where X, Y, Z, T, U, V, and W are calculated as above.

The $^1$H NMR analysis can be used with certain simplifying assumptions to estimate the mole percents of the three major components in the thermoplastic compositions: (1) diblock plus triblock poly(phenylene ether)-polysiloxane block copolymers ("PPE-Si" in Table 4), (2) bifunctional poly(phenylene ether) copolymer (i.e., 2,6-dimethylphenol/2,3,6-trimethylphenol copolymer having a hydroxy group on each end; "PPE-2OH" in Table 4), and (3) monofunctional poly(phenylene ether) copolymer (i.e., 2,6-dimethylphenol/2,3,6-trimethylphenol copolymer having a hydroxy group on one end; "PPE-OH" in Table 4). The simplifying assumptions are as follows. First, when the copolymer is isolated by precipitation from isopropanol (IPA), all the residual (unreacted) eugenol-capped polysiloxane is removed. This assumption is based on the observation that eugenol-capped polysiloxane is highly soluble in isopropanol. Second, every polymer chain has either a eugenol-capped polysiloxane group, a 2,6-dimethylphenol tail (Formula (III)) (note that no 2,3,6-trimethylphenol tail was detected), or a biphenyl group (Formula (II)) (note that no biphenyl groups with 2,3,6-trimethylphenyl units were detected). Third, any given polymer chain cannot have more than one of the above mentioned groups. The second and third assumptions rest on the generally accepted poly(phenylene ether) polymerization mechanism in which an incoming monomer unit attacks the unsubstituted para position of the terminal (tail) unit of a growing poly(phenylene ether) chain, thereby forming a reactive quinone ketal intermediate. In other words, in the thermoplastic composition isolated from precipitation in isopropanol, the "eugenol-capped polysiloxane group" is present in and a proxy for poly(phenylene ether)-polysiloxane diblock copolymer and polysiloxane-poly(phenylene ether)-polysiloxane triblock copolymer ("PPE-Si"); "2,6-dimethylphenol tail" is present in and a proxy for head-to-tail poly(2,6-dimethyl-1,4-phenylene ether-co-2,3,6-trimethyl-1,4-phenylyene ether) (i.e., monofunctional or hydroxyl-monoterminated copolymer of 2,6-dimethylphenol and 2,3,6-trimethylphenol; "PPE-OH"); and "biphenyl group" is present in and a proxy for poly(2,6-dimethyl-1,4-phenylene ether-co-2,3,6-trimethyl-1,4-phenylyene ether) containing a single biphenyl group per molecule (i.e., bifunctional or hydroxy-diterminated copolymer of 2,6-dimethylphenol and 2,3,6-trimethylphenol; "PPE-2OH"). Fourth, no significant branching exists in the samples. This assumption is based on the fact that there was no detection by $^1$H NMR of peaks that would have been expected from branch point hydrogen atoms. Fifth, the polydispersity of the eugenol-capped polysiloxane will not impact the analysis. Sixth, the polysiloxane moiety of the eugenol-capped polysiloxane has on average 282 hydrogen atoms per chain (corresponding to an average of 45 internal dimethylsiloxane units and two dimethylsiloxane units bonded to the terminal eugenol residues). Based on the above assumptions and $^1$H NMR data, the mole percents of the three major components of the thermoplastic composition were calculated and are presented in Table 4. The results indicate that the Example 1 and 2 copolymers of 2,6-dimethylphenol, 2,3,6-trimethylphenol, and hydroxyaryl-terminated polysiloxane have less bifunctional poly(phenylene ether) ("PPE-2OH"), more monofunctional poly(phenylene ether) ("PPE-OH)", and more poly(phenylene ether)-polysiloxane block copolymer ("PPE-Si") than the Comparative Example 4-6 copolymers of 2,6-dimethylphenol and hydroxyaryl-terminated polysiloxane.

TABLE 4

| | $^1$H NMR (wt %) | | | | | | Mol % | | |
|---|---|---|---|---|---|---|---|---|---|
| Sample | Si | TMP | Biph | Tail | Ext Man | Int Man | PPE-Si | PPE-2OH | PPE-OH |
| DMP Homopolymer | | | | | | | | | |
| C. Ex. 1 | 0 | 0 | 0.998 | 0.286 | 0.449 | 0.183 | 0.0 | 63.8 | 36.2 |
| C. Ex. 2 | 0 | 0 | 1.104 | 0.239 | 0.571 | 0.139 | 0.0 | 69.9 | 30.1 |
| C. Ex. 3 | 0 | 0 | 1.125 | 0.264 | 0.625 | 0.112 | 0.0 | 68.3 | 31.7 |

TABLE 4-continued

| | ¹H NMR (wt %) | | | | | | Mol % | | |
|---|---|---|---|---|---|---|---|---|---|
| Sample | Si | TMP | Biph | Tail | Ext Man | Int Man | PPE-Si | PPE-2OH | PPE-OH |
| DMP-D45 Copolymer | | | | | | | | | |
| C. Ex. 4 | 4.76 | 0 | 0.918 | 0.222 | 0.233 | 0.148 | 18.2 | 55.3 | 26.6 |
| C. Ex. 5 | 4.84 | 0 | 0.875 | 0.238 | 0.400 | 0.158 | 18.5 | 52.9 | 28.5 |
| C. Ex. 6 | 4.46 | 0 | 1.154 | 0.241 | 0.558 | 0.137 | 14.7 | 60.3 | 25.0 |
| DMP-TMP Copolymer | | | | | | | | | |
| C. Ex. 7 | 0 | 16.6 | 0.653 | 0.335 | 0.292 | 0.069 | 0.0 | 50.0 | 50.0 |
| C. Ex. 8 | 0 | 17.0 | 0.653 | 0.305 | 0.255 | 0.034 | 0.0 | 52.3 | 47.7 |
| DMP-TMP-D45 Copolymer | | | | | | | | | |
| Ex. 1 | 4.59 | 15.39 | 0.556 | 0.231 | 0.334 | 0.107 | 22.3 | 42.7 | 35.1 |
| Ex. 2 | 4.78 | 15.29 | 0.557 | 0.141 | 0.310 | 0.110 | 26.6 | 48.9 | 24.5 |

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A method of preparing a thermoplastic composition, comprising:
   oxidatively copolymerizing a monomer composition in an aromatic hydrocarbon solvent to form a solution comprising
      a poly(2,6-dimethyl-1,4-phenylene ether-co-2,3,6-trimethyl-1,4-phenylene ether); and
      a block copolymer comprising
         a poly(2,6-dimethyl-1,4-phenylene ether-co-2,3,6-trimethyl-1,4-phenylene ether) block, and
         a polysiloxane block comprising, on average, about 10 to about 100 siloxane repeating units;
   wherein the poly(2,6-dimethyl-1,4-phenylene ether)-co-2,3,6-trimethyl-1,4-phenylene ether) block and the polysiloxane block are linked via an ether oxygen;
   wherein the monomer composition comprises
      about 65 to about 93 weight percent of 2,6-dimethylphenol,
      about 5 to about 25 weight percent of 2,3,6-trimethylphenol, and
      about 2 to about 10 weight percent of a hydroxyaryl-terminated polysiloxane;
   wherein said oxidatively copolymerizing a monomer composition comprises a monomer addition period characterized by a first temperature, a build period following the addition period and characterized by a second temperature greater than the first temperature, and a temperature ramp period between the addition period and the build period; and wherein the temperature ramp period comprises increasing the temperature at an average rate of 0.1 to 0.3° C. per minute.

2. The method of claim 1, wherein the monomer composition comprises about 10 to about 22 weight percent of the 2,3,6-trimethylphenol.

3. The method of claim 1, wherein the monomer composition comprises about 13 to about 19 weight percent of the 2,3,6-trimethylphenol.

4. The method of claim 1, wherein the hydroxyaryl-terminated polysiloxane has the structure

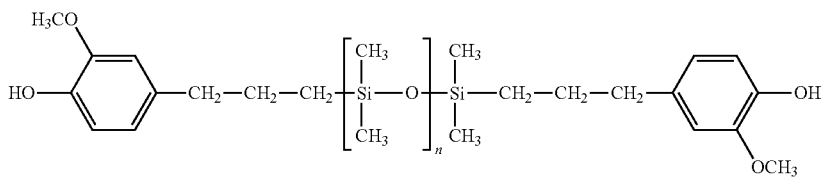

wherein n is about 35 to about 60.

5. The method of claim 4, wherein the monomer composition comprises about 70 to about 88 weight percent of the 2,6-dimethylphenol, about 10 to about 22 weight percent of the 2,3,6-trimethylphenol, and about 3 to about 7 weight percent of the hydroxyaryl-terminated polysiloxane.

* * * * *